US012528681B1

United States Patent
Liu et al.

(10) Patent No.: US 12,528,681 B1
(45) Date of Patent: Jan. 20, 2026

(54) MOBILE ROBOT AND CONTROL METHOD THEREFOR, AND CONTROLLER

(71) Applicant: VisionNav Robotics USA Inc., Acworth, GA (US)

(72) Inventors: You Liu, Acworth, GA (US); Yujie Lu, Acworth, GA (US); Wenjie Li, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/173,576

(22) Filed: Apr. 8, 2025

(51) Int. Cl.
| | | |
|---|---|---|
| *B66F 9/06* | (2006.01) |
| *B60K 1/02* | (2006.01) |
| *B62D 6/00* | (2006.01) |
| *B62D 7/18* | (2006.01) |
| *B66F 9/075* | (2006.01) |

(52) U.S. Cl.
CPC ............... *B66F 9/063* (2013.01); *B60K 1/02* (2013.01); *B62D 6/002* (2013.01); *B66F 9/0755* (2013.01); *B66F 9/07568* (2013.01); *B66F 9/07572* (2013.01); *B62D 7/18* (2013.01)

(58) Field of Classification Search
CPC .... B66F 9/063; B66F 9/0755; B66F 9/07568; B60K 1/02; B62D 6/002; B62D 7/18
See application file for complete search history.

(56) References Cited

U.S. PATENT DOCUMENTS

| | | | | |
|---|---|---|---|---|
| 2001/0008985 A1* | 7/2001 | Wada | ................... | G05D 1/0272 701/1 |
| 2011/0071715 A1* | 3/2011 | Akimoto | ................ | B62K 11/06 701/22 |
| 2021/0009108 A1* | 1/2021 | Tsukano | ................ | B60W 30/02 |
| 2024/0310851 A1* | 9/2024 | Ebrahimi Afrouzi | ... | G01S 17/87 |
| 2024/0385619 A1* | 11/2024 | Kaufman | ................ | B60L 15/20 |
| 2025/0172942 A1* | 5/2025 | Ebrahimi Afrouzi | ........................ | A47L 9/0477 |

FOREIGN PATENT DOCUMENTS

| | | |
|---|---|---|
| CN | 109765894 A | 5/2019 |
| CN | 111497637 A | 8/2020 |

OTHER PUBLICATIONS

Jin et al., J. Obstacle Avoidance of Two-Wheel Differential Robots Considering the Uncertainty of Robot Motion on the Basis of Encoder Odometry Information, Google Scholar, MDPI, Sensors 2019, School of Mechanical Engineering, Korea University, Jan. 2019, p. 1-16. (Year: 2019).*

* cited by examiner

*Primary Examiner* — Russell Frejd
(74) *Attorney, Agent, or Firm* — Muncy, Geissler, Olds & Lowe, P.C.

(57) ABSTRACT

The disclosure relates to a mobile robot and a control method therefor, and a controller. The mobile robot includes: a controller. The controller executes a program instruction so as to implement the following steps: receiving an angular velocity, a translational velocity, a first distance, and a second distance of the mobile robot (1); controlling motion of a first wheel (501) of the mobile robot (1) according to the angular velocity, the translational velocity, and the first distance; and controlling motion of a second wheel (502) of the mobile robot (1) according to the angular velocity, the translational velocity, and the second distance, where the motion of each wheel includes driving rotation and steering rotation.

19 Claims, 14 Drawing Sheets

MOBILE ROBOT AND CONTROL METHOD THEREFOR, AND CONTROLLER

BACKGROUND OF THE INVENTION

Field of the Invention

The disclosure relates to a mobile robot and a control method therefor.

Description of the Prior Art

Wheels of an existing mobile robot are generally controlled to be steered through a steering engine (for example, a steering wheel), and are driven to rotate forward through a driving mechanism (for example, a fossil-fueled engine or a driving motor). In this way, the mobile robot is steered in a forward movement process.

BRIEF DESCRIPTION OF THE DRAWINGS

The drawings are shown through examples, and the disclosure is not intended to be limited by the accompanying drawings.

Figure 1:
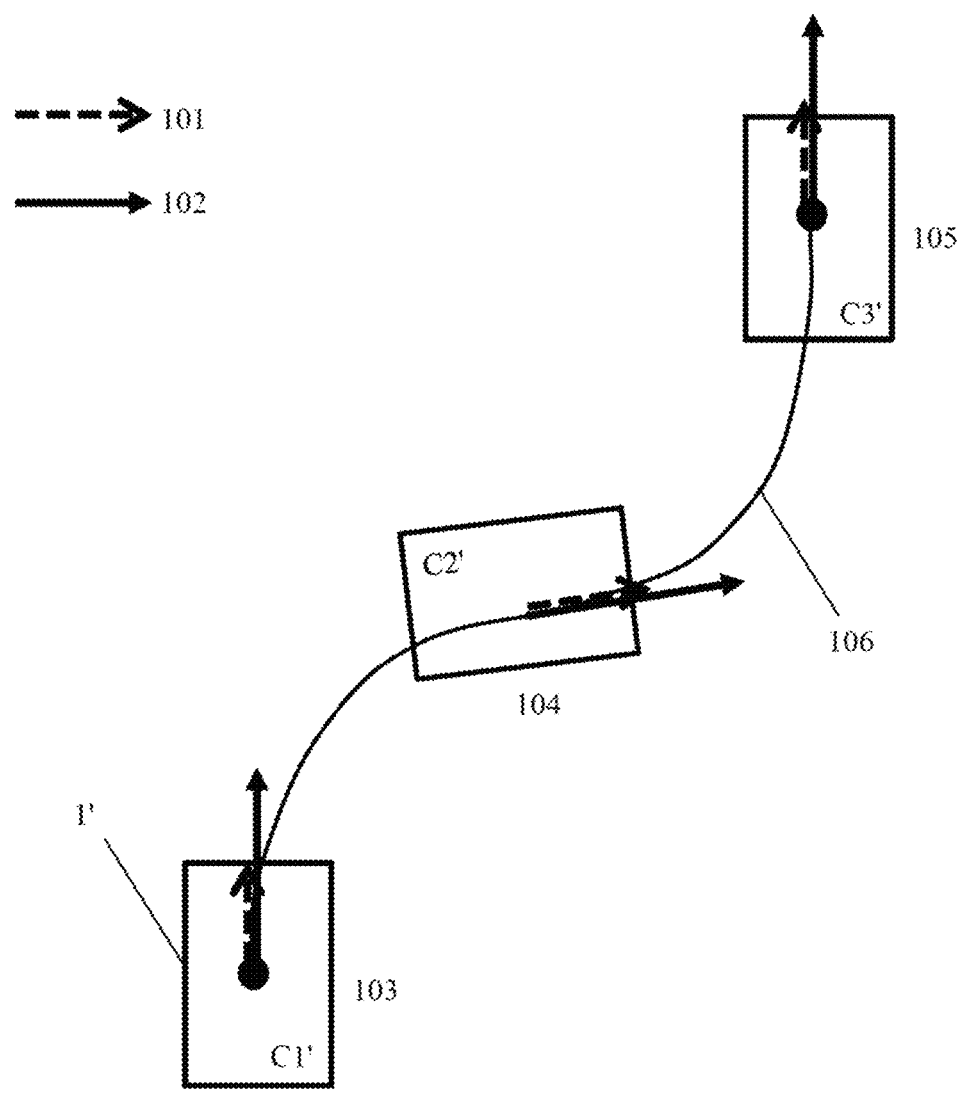
FIG. 1 shows a path of coupling motion of a vehicle in some embodiments.

Details of one or more embodiments are set forth in the accompanying drawings and the following description. Other features and advantages will be apparent from the description, drawings and claims.

DETAILED DESCRIPTION

The following description will be provided in conjunction with the accompanying drawings so as to facilitate understanding of teaching contents disclosed herein. The following discussion will focus on specific implementations and embodiments of the teaching contents. The focus is provided to facilitate description of the teaching contents, and should not be construed as a limitation to the scope or applicability of the teaching contents. However, other embodiments may be used based on the teaching contents disclosed in the disclosure.

The terms "include", "comprise" and "have" as well as their any variations in the embodiments of the disclosure are intended to cover non-exclusive inclusion. For instance, processes, methods, systems, products or devices including a series of steps or units do not need to be limited by those explicitly listed, and may include other steps or units not explicitly listed or inherent to these processes, methods, products, or devices.

In addition, unless otherwise explicitly stated, "or" refers to an inclusive "or" rather than an exclusive "or". For example, any one of the following may satisfy the condition A or B: A is true (or existent) and B is false (or not existent); A is false (or not existent) and B is true (or existent); and both A and B are true (or existent).

The terms such as "first" and "second" in claims of the disclosure are used to distinguish different objects, instead of describing a specific order of objects. For example, without departing from the scope of the disclosure, a first parameter may be referred to as a second parameter, and similarly, a second parameter may be referred to as a first parameter.

Unless otherwise defined, all technical and scientific terms used herein have identical meanings as commonly understood by those of ordinary skill in the art to which the disclosure belongs.

In some embodiments, a mobile robot disclosed in the disclosure may be a vehicle, and for example, an automated guided vehicle (AGV).

For ease of description, related hardware is defined in the disclosure as follows:

a processor responsible for executing core functions such as computation, control, and decision. The processor may receive data from a sensor, run a control algorithm, etc., and instruct an executor to complete a task. Common types of the processor may include: a central processing unit (CPU), a digital signal processor (DSP), a micro controller unit (MCU), etc. The processor may denote a processor set configured to execute an identical task or different tasks herein.

A memory is configured to store data, a program algorithm, etc. The memory may denote a memory set configured to execute an identical task or different tasks herein. Optionally, the processor, a sensor, and a controller in the disclosure may all include respective memories/storage units.

The controller may generally include a processor and a memory at a hardware level. Optionally, the controller may further include parts such as an input/output interface, a mainboard, and a peripheral circuit and element. At a software level, parts such as a control algorithm, an operating system, and a communication protocol may be generally included. The controller may denote a controller set configured to execute an identical task or different tasks herein.

Motion of wheels involved in the disclosure includes two modes:

1. driving rotation of a wheel, which is defined as rotation of the wheel around an axle, used to drive the wheel forward or backward, and referred to as "axle rotation" or "driving rotation"; and 2. steering rotation of a wheel, which is defined as rotation of the wheel about a kingpin, used to drive steering of the wheel, and referred to as "kingpin steering rotation" or "pivot steering rotation", or "steering rotation" for short.

FIG. 1 shows a path of coupling motion of a vehicle in some embodiments.

As shown in FIG. 1, when a vehicle 1' is traveling, a steering wheel (that is, a wheel capable of implementing steering rotation, and for example, a front wheel, not shown in FIG. 1) may be controlled to turn through a steering means, so as to drive the vehicle or a vehicle chassis to rotate in a turning direction of the steering wheel, such that a vehicle body is steered.

The vehicle 1' moves forward along a path 106. A dotted arrow shown in FIG. 1 indicates a vehicle body direction 101 of the vehicle 1' when the vehicle travels on the path 106. A solid arrow shown in FIG. 1 indicates a tangent line direction 102 of the vehicle 1' when the vehicle travels on the path 106.

The path 106 may include, but is not limited to, a position 103, a position 104, and a position 105. The vehicle 1' is located at the position 103 at time C1'. The vehicle 1' is located at the position 104 at time C2'. The vehicle 1' is located at the position 105 at time C3'. The position 103 is different from the position 104. The position 104 is different from the position 105. The position 103 is different from the position 105.

The vehicle body direction 101 of the vehicle 1' at the position 103 and the tangent line direction 102 are identical, parallel, or overlapped. The vehicle body direction 101 of the vehicle 1' at the position 104 and the tangent line direction 102 are identical, parallel, or overlapped. The vehicle body direction 101 of the vehicle 1' at the position 105 and the tangent line direction 102 are identical, parallel, or overlapped.

A motion mode in which the vehicle 1' travels from the position 103 to the position 104 and then to the position 105 may be defined as "coupling motion of rotation and translation", or "coupling motion" for short.

Figure 2:
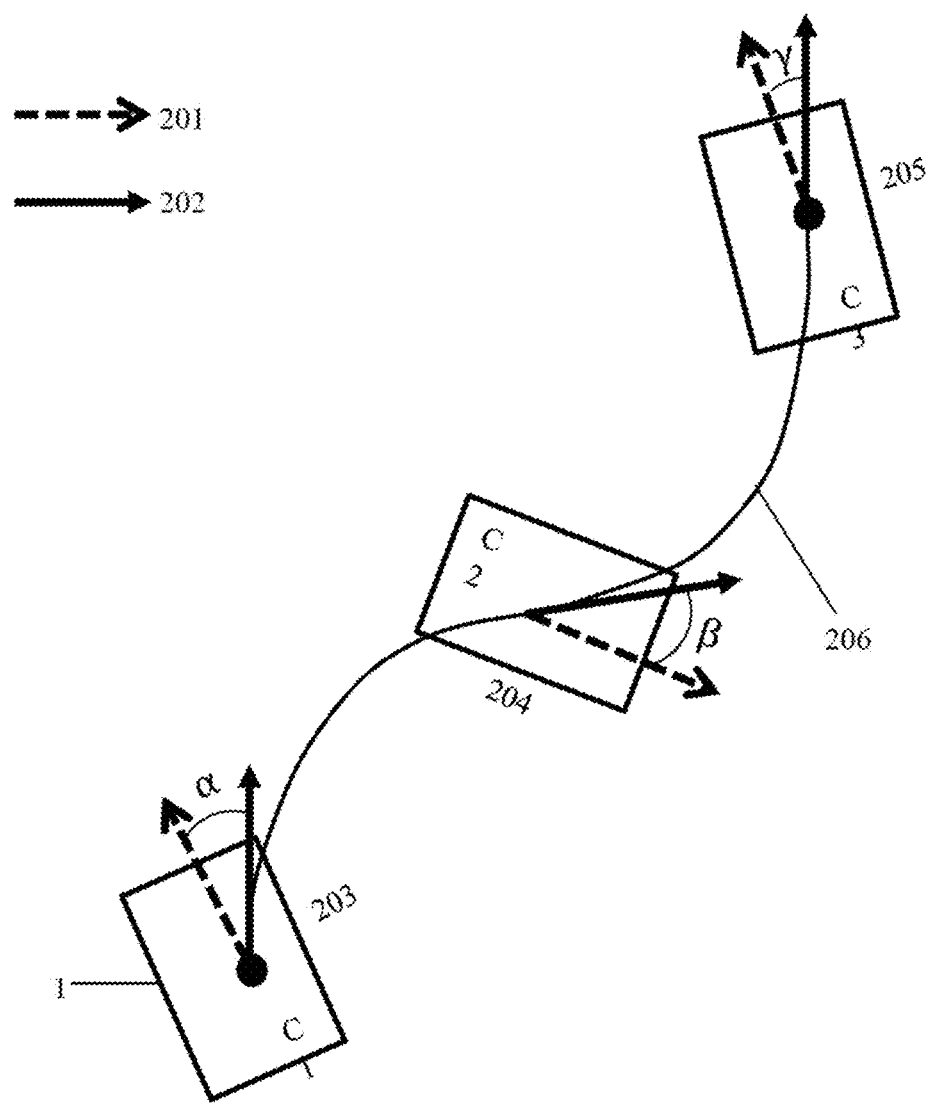
FIG. 2 shows a path of decoupling motion of a vehicle in some embodiments.

FIG. 2 shows a path of decoupling motion of a vehicle in some embodiments.

As shown in FIG. 2, a vehicle 1 moves forward along a path 206. A hollow arrow shown in FIG. 2 indicates a vehicle body direction 201 of the vehicle 1 when the vehicle travels on the path 206. A solid arrow shown in FIG. 2 indicates a tangent line direction 202 of the vehicle 1 when the vehicle travels on the path 206.

The path 206 may include, but is not limited to, a position 203, a position 204, and a position 205. The vehicle 1 is located at the position 203 at time C1. The vehicle 1 is located at the position 204 at time C2. The vehicle 1 is located at the position 205 at time C3. The position 203 is different from the position 204. The position 204 is different from the position 205. The position 203 is different from the position 205.

The vehicle body direction 201 of the vehicle 1 at the position 203 and the tangent line direction 202 are different, non-parallel, or non-overlapped. The vehicle body direction 201 of the vehicle 1 at the position 204 and the tangent line direction 202 are different, non-parallel, or non-overlapped. The vehicle body direction 201 of the vehicle 1 at the position 205 and the tangent line direction 202 are different, non-parallel, or non-overlapped.

An included angle α exists between the vehicle body direction 201 and the tangent line direction 202 of the vehicle 1 at the position 203. An included angle β. exists between the vehicle body direction 201 and the tangent line direction 202 of the vehicle 1 at the position 204. An included angle γ exists between the vehicle body direction 201 and the tangent line direction 202 of the vehicle 1 at the position 205. In some embodiments, the included angle α is equal to the included angle β. In some embodiments, the included angle α is not equal to the included angle β. In some embodiments, the included angle β is equal to the included angle γ. In some embodiments, the included angle β is not equal to the included angle γ. In some embodiments, the included angle α is equal to the included angle γ. In some embodiments, the included angle α is not equal to the included angle γ.

The motion mode in which the vehicle 1 travels from the position 203 to the position 204 and then to the position 205 may be defined as "decoupling motion of rotation and translation", or "decoupling motion" for short.

Figure 3:
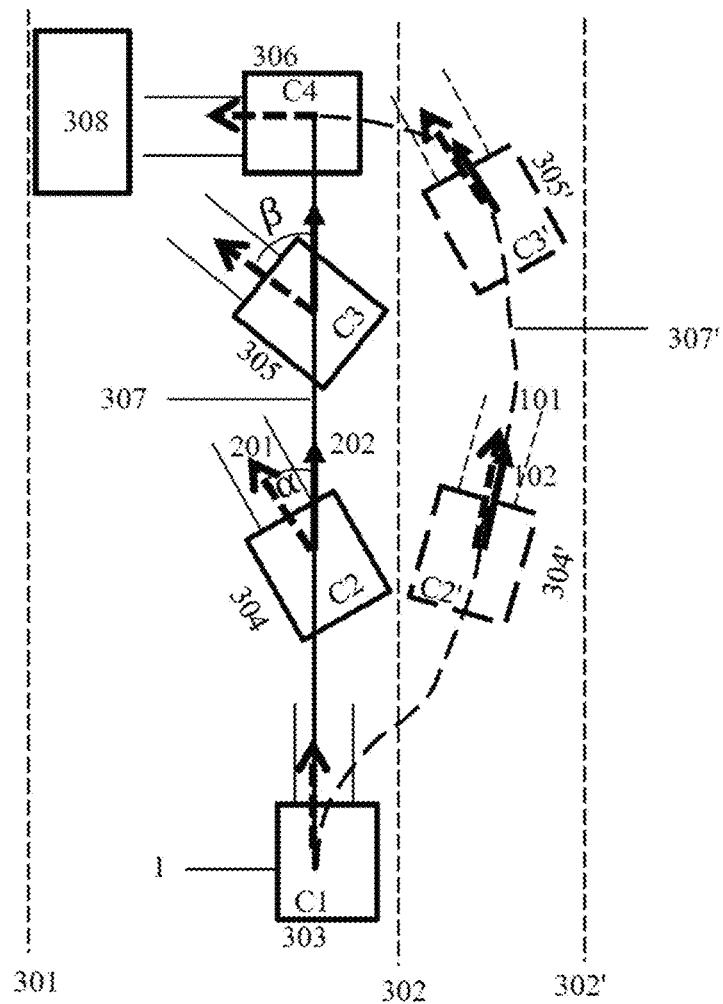
FIG. 3 shows a comparison of coupling motion and decoupling motion paths of a vehicle in some embodiments.

FIG. 3 shows a comparison of coupling motion and decoupling motion paths of a vehicle in some embodiments.

As shown in FIG. 3, the vehicle 1 moves along a path 307. The hollow arrow in the figure indicates the vehicle body direction 201 of the vehicle 1 when the vehicle travels on the path 307. The solid arrow shown in the figure indicates the tangent line direction 202 of the vehicle 1 when the vehicle travels on the path 307.

The path 307 may include, but is not limited to, a position 303, a position 304, a position 305, and a position 306. The vehicle 1 is located at the position 303 at time C1. The vehicle 1 is located at the position 304 at time C2. The vehicle 1 is located at the position 305 at time C3. The vehicle 1 is located at the position 306 at time C4. The position 303, the position 304, the position 305 and the position 306 may be different positions in the path 307. The position 303 in FIG. 3 may be an initial position of the vehicle 1 in the path 307. The position 306 may be an end point position of the vehicle 1 in the path 307.

The vehicle body direction 201 of the vehicle 1 at the position 304 and the tangent line direction 202 are different, non-parallel, or non-overlapped. The vehicle body direction 201 of the vehicle 1 at the position 305 and the tangent line direction 202 are different, non-parallel, or non-overlapped.

An included angle α exists between the vehicle body direction 201 and the tangent line direction 202 of the vehicle 1 at the position 304. An included angle β exists between the vehicle body direction 201 and the tangent line direction 202 of the vehicle 1 at the position 305. In some embodiments, the included angle α is equal to the included angle β. In some embodiments, the included angle α is not equal to the included angle β.

Thus, motion of the vehicle 1 along the path 307 is decoupling motion.

As shown in FIG. 3, the vehicle 1 may alternatively move along another path 307'. The hollow arrow in the figure indicates the vehicle body direction 101 of the vehicle 1 when the vehicle travels on the path 307. The solid arrow shown in the figure indicates the tangent line direction 102 of the vehicle 1 when the vehicle travels on the path 307'.

The path 307' may include, but is not limited to, a position 303, a position 304', a position 305', and a position 306. The vehicle 1 is located at the position 303 at time C1. The vehicle 1 is located at the position 304' at time C2'. The vehicle 1 is located at the position 305' at time C3'. The vehicle 1 is located at the position 306 at time C4. The position 303, the position 304', the position 305' and the position 306 may be different positions in the path 307'. The position 303 may be an initial position of the vehicle 1 in the path 307'. The position 306 may be an end point position of the vehicle 1 in the path 307'.

The vehicle body direction 101 of the vehicle 1 at the position 304' and the tangent line direction 102 are identical, parallel, or overlapped. The vehicle body direction 101 of the vehicle 1 at the position 305' and the tangent line direction 102 are identical, parallel, or overlapped.

Motion of the vehicle 1 at the position 304' may be a coupling motion. Motion of the vehicle 1 at the position 305' may be a coupling motion.

The path 307 may include a straight line. When the vehicle 1 travels from a starting point 303 to an end point 306 of the path 307, the vehicle body direction 201 is turned leftward or anticlockwise by 90°.

The path 307' may include an arc-shaped line. When the vehicle 1' travels from a starting point 303 to an end point 306 of the path 307', the vehicle body direction 101 is turned leftward or anticlockwise by 90°.

In FIG. 3, the vehicle 1 may travel along the path 307 to fetch goods 308. The vehicle 1 may travel along the path 307' to fetch goods 308. A length of the path 307 is less than that of the path 307'. Motion of the vehicle 1 along the path 307 may be identical or similar to motion of the vehicle 1 along the path 206 as shown in FIG. 2. Motion of the vehicle 1 along the path 307' may be identical or similar to motion of the vehicle 1' along the path 106 as shown in FIG. 1. Motion of the vehicle 1 to fetch the goods 308 along the path 307 may include decoupling motion. Compared with a process of fetching the goods 308 along the path 307', a process of the vehicle 1 to fetch the goods 308 along the path 307 may include a larger amount of decoupling motion.

The vehicle 1 may travel along the path 307 to fetch the goods 308 between a boundary 301 and a boundary 302. The vehicle 1 may travel along the path 307' to fetch the goods 308 between the boundary 301 and a boundary 302'. A distance between the boundary 301 and the boundary 302 is less than that between the boundary 301 and the boundary 302'. The boundary 302 is located between the boundary 301 and the boundary 302'. Motion of the vehicle 1 to fetch the goods 308 along the path 307 requires smaller space.

When the vehicle 1 includes more motion identical or similar to motion of the vehicle 1 shown in FIG. 2 along the path 206 in a driving process, the vehicle 1 may travel along the path similar to the path 307 shown in FIG. 3 to fetch the goods 308. In other words, when the vehicle 1 spends relatively more time in traveling in a motion mode identical or similar to that of the vehicle 1 shown in FIG. 2 along the path 206, the vehicle 1 may travel along the path similar to the path 307 shown in FIG. 3 to fetch the goods 308.

When the vehicle 1 includes more motion identical or similar to motion of the vehicle 1' shown in FIG. 1 along the path 106 in a driving process, the vehicle 1 may travel along the path similar to the path 307' shown in FIG. 3 to fetch the goods 308. In other words, when the vehicle 1 spends relatively more time in traveling in a motion mode identical or similar to that of the vehicle 1' shown in FIG. 1 along the path 106, the vehicle 1 may travel along the path similar to the path 307' shown in FIG. 3 to fetch the goods 308.

In addition to the path 307 and the path 307', the vehicle 1 may be controlled to select another path to fetch the goods 308.

The vehicle 1 may be, but is not limited to, a forklift for example. In other examples, the vehicle 1 may also be, but is not limited to, a carrier vehicle or a robot.

Figure 4A:
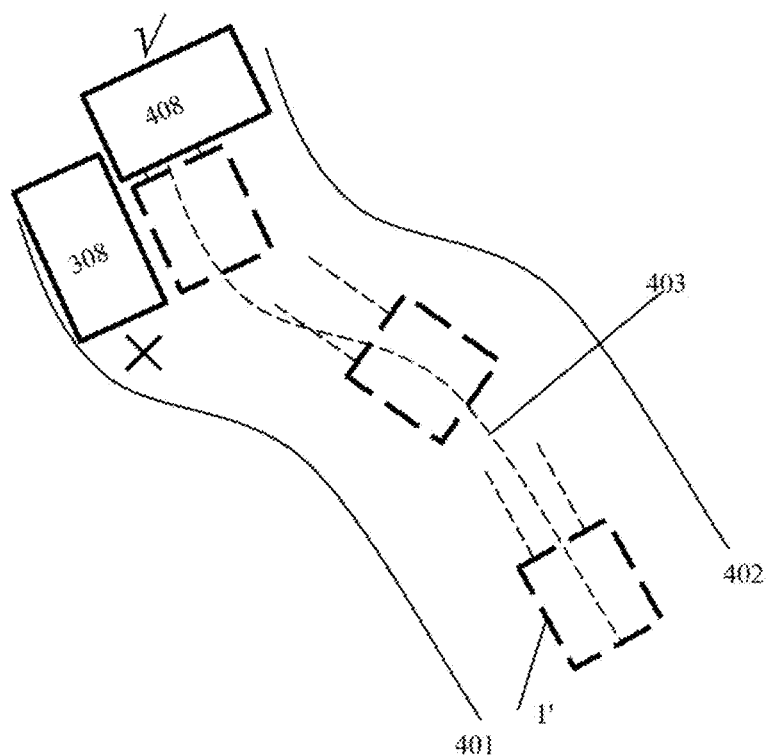
FIGS. 4a and 4b show a schematic diagram of goods delivery of a vehicle in some embodiments.

FIG. 4a shows a schematic diagram of goods delivery of a vehicle in some embodiments.

In FIG. 4a, the goods 308 and goods 408 are located at different positions respectively, and boundaries 401 and 402 define a channel in which the vehicle 1 may travel. The vehicle 1 may travel along a path 403 to fetch the goods 408. Motion of the vehicle 1 along the path 403 may be identical or similar to motion of the vehicle 1' along the path 106 as shown in FIG. 1. However, the vehicle 1 fails to travel along the path 403 to fetch the goods 308.

Figure 4B:
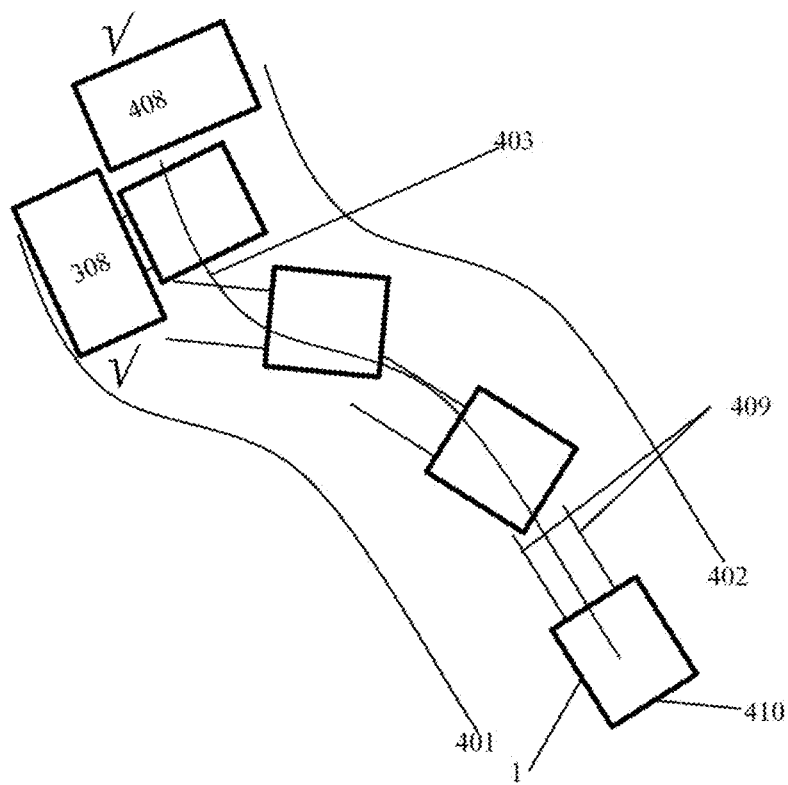

In FIG. 4b, the goods 308 and the goods 408 are located at different positions respectively, and the boundaries 401 and 402 define the channel on which the vehicle 1 may travel. A scene in FIG. 4b is identical or similar to that in FIG. 4a. The vehicle 1 may travel along a path 403 to fetch the goods 408. The vehicle 1 may travel along a path 403 to fetch the goods 308. Motion of the vehicle 1 along the path 403 may be identical or similar to motion of the vehicle 1' along the path 106 as shown in FIG. 1. Motion of the vehicle 1 along the path 403 may be identical or similar to motion of the vehicle 1 along the path 206 as shown in FIG. 2.

A difference between FIG. 4b and FIG. 4a lies in that, when the vehicle 1 moves along the path 403, the vehicle may include more motion identical or similar to motion of the vehicle 1 shown in FIG. 2 along the path 206, such that a pallet fork 409 of the vehicle 1 may successfully fetch the goods 308 or the goods 408.

Figure 5:
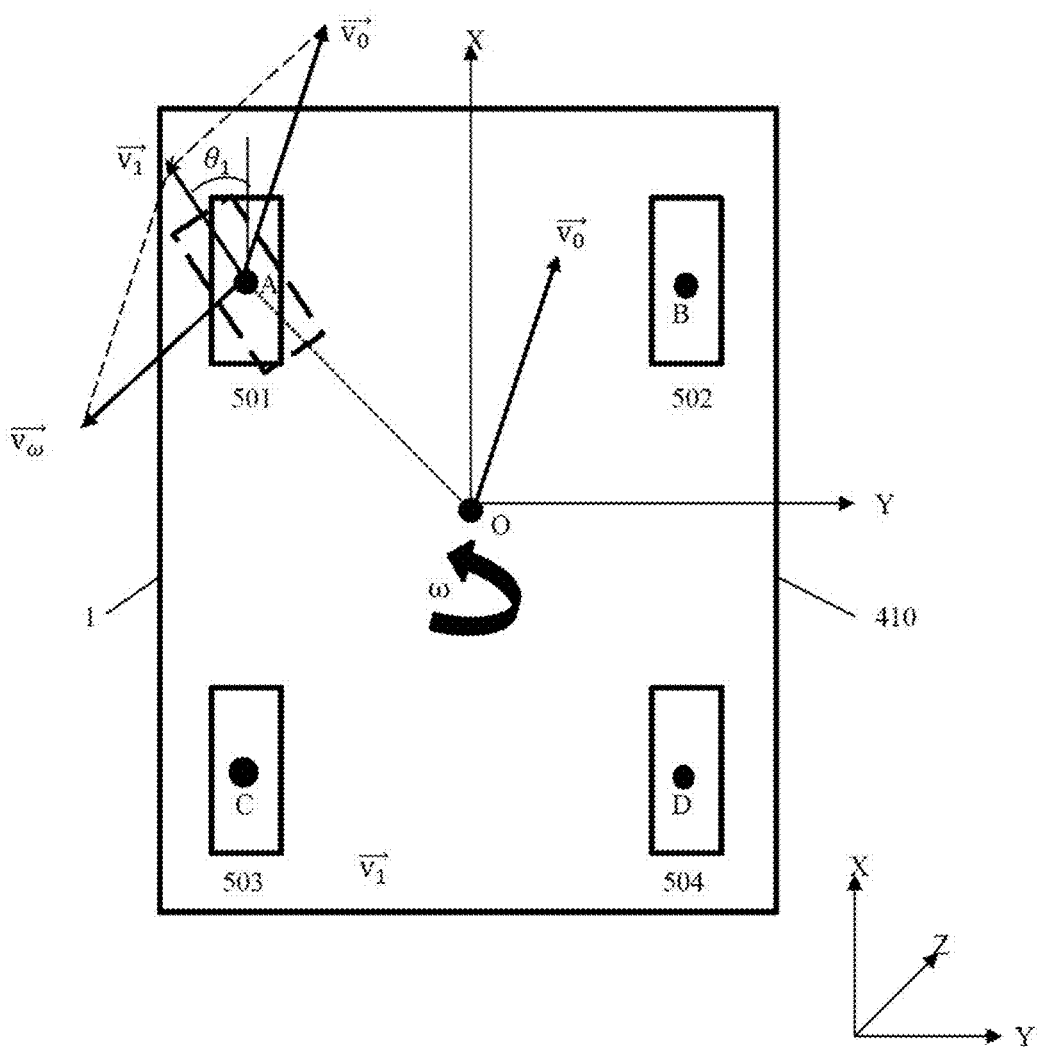
FIG. 5 shows a schematic diagram of a top view of a body of a vehicle in some embodiments.

FIG. 5 shows a schematic diagram of a top view of the vehicle 1 in some embodiments.

As shown in FIG. 5, the vehicle 1 includes a vehicle body 410 and a pallet fork (not shown in the figure). The vehicle body 410 includes wheels 501, 502, 503, and 504. A central point of the vehicle body 410 is denoted by O, and a central point of the wheel 501 is denoted by A. The wheel 501 may rotate around a vertical rotation axis (for example, a kingpin) passing the central point A, that is, the wheel 501 may conduct steering rotation. The wheel 501 may alternatively rotate around a horizontal rotation axis (for example, an axle) passing the central point A, that is, the wheel 501 may conduct driving rotation. A dotted line in FIG. 5 shows a wheel contour after the wheel 501 rotates around the vertical rotation axis by an angle $\theta_1$. The angle $\theta_1$ is referred to as a steering angle of the wheel 501, and is defined as an included angle between the wheel 501 and a vehicle body direction.

The vehicle body 410 has a translational velocity vector $\vec{v}_0$ that is parallel to a tangent line direction of a traveling path of the vehicle 1. The vehicle body 410 further has an angular velocity vector $\vec{\omega}$ whose direction is determined according to a right-hand rule. A velocity vector of the wheel 501 is $\vec{v}_1$.

To implement decoupling motion of rotation and translation of the vehicle body 410 of the vehicle 1, a motion relation of the vehicle body 410 and the wheel 501 at least has to satisfy the following formula:

$$\vec{v}_1 = \vec{\omega} \times \vec{OA} + \vec{v}_0 \quad (1)$$

$\vec{OA}$ denotes a distance vector from a central point O of the vehicle body 410 to a central point of the wheel 501. A direction of the velocity vector $\vec{v}_1$ of the wheel 501 is identical to that of the wheel 501. A magnitude of the velocity vector $\vec{v}_1$ of the wheel 501 is identical to a velocity of the wheel 501.

During actual running of the vehicle 1, the translational velocity vector $\vec{v}_0$ and the angular velocity vector $\vec{\omega}$ of the vehicle body 410 are preset system values. A distance vector $\vec{OA}$ is an inherent parameter of the vehicle 1. Thus, the velocity vector $\vec{v}_1$ of the wheel 501 may be computed according to the above formula. The processor of the vehicle 1 adjusts a direction of the wheel 501 according to the direction of the velocity vector $\vec{v}_1$, and adjusts the velocity of the wheel 501 according to the magnitude of the velocity vector $\vec{v_1}$, such that decoupling motion of the vehicle 1 is implemented.

To facilitate computation of values of the above parameters, in the disclosure, a vehicle body coordinate system OXYZ is established with the central point O of the vehicle body 410 as an origin, as shown in FIG. 5. An XY plane of the vehicle body coordinate system OXYZ is a plane in which the vehicle body 410 is located. A positive direction of an X axis is a direction starting from a point O and facing a rear portion (as shown in FIG. 5) of the vehicle body 410. A positive direction of a Y axis is a direction starting from a point O and facing a right side (as shown in FIG. 5) of the vehicle body 410.

In the vehicle body coordinate system OXYZ, an angular velocity vector $\vec{\omega}$ of the vehicle body 410 may be expressed as (0, 0, ω). According to a right-hand rule, a direction of an angular velocity vector $\vec{\omega}$ is perpendicular to a paper surface and faces upward in FIG. 5 (that is, in an opposite direction along a Z axis). A translational velocity $\vec{v_0}$ of the vehicle body 410 may be expressed as $(v_x, v_y, 0)$. As the translational velocity $\vec{v_0}$ of the vehicle body 410 is parallel to a plane of the vehicle body, no Z axis component exists. In an initial state of the vehicle 1, the direction of the translational velocity $\vec{v_0}$ of the vehicle body 410 is identical to the positive direction of the X axis. When the vehicle body 410 rotates at the angular velocity ω, a component of the translational velocity $\vec{v_0}$ of the vehicle body 410 is $v_x$, and $v_y$ constitutes a function of time t. Specifically, $v_x$ and $v_y$ satisfy the following relations:

$$v_x = v_0 \cos(\omega t)$$

$$v_y = v_0 \sin(\omega t) \qquad (2)$$

The sum of velocity vectors $\vec{v_1}$ of the wheel 501 may be expressed as components of the OXYZ coordinate system through the steering angle $\theta_1$ as follows:

$$\vec{v_1} = v_1 * \begin{pmatrix} \cos \theta_1 \\ \sin \theta_1 \\ 0 \end{pmatrix}, \qquad (3)$$

where $v_1$ denotes the magnitude of the velocity vector $\vec{v_1}$ of the wheel 501, that is, the velocity of the wheel. As the wheel 501 moves along a plane of the vehicle body, the Z axis component is 0.

Further, when a radius of the wheel 501 is $r_1$ and a rotation velocity of a driving motor is $n_1$, the velocity of the wheel 501 is:

$$v_1 = 2\pi n_1 * r_1 \qquad (4)$$

In conclusion, the velocity vector $\vec{v_1}$ of the wheel 501 may be expressed as:

$$\vec{v_1} = 2\pi n_1 * r_1 * \begin{pmatrix} \cos \theta_1 \\ \sin \theta_1 \\ 0 \end{pmatrix} \qquad (5)$$

Similarly, a component of a distance vector $\vec{OA}$ from the central point O of the vehicle body 410 to a rotation center point A of the wheel 501 in the OXYZ coordinate system may be expressed as:

$$\vec{OA} = \begin{pmatrix} x_A \\ y_A \\ z_A \end{pmatrix} \qquad (6)$$

Through integration of the formulas (1) to (6), the steering angle $\theta_1$ of the wheel 501 and the rotation velocity of the driving motor of the wheel 501 may be determined. Specific computation formulas are:

$$\theta_1 = \tan^{-1}\left[\frac{x_A \omega + v_0 \sin(\omega t)}{-y_A \omega + v_0 \cos(\omega t)}\right] \qquad (7)$$

$$n_1 = \frac{x_A \omega + v_0 \sin(\omega t)}{2\pi r_1 \sin \theta_1} \qquad (8)$$

In the formulas, the magnitude ω of the angular velocity and the translational velocity $v_0$ of the vehicle body 410 are preset values transmitted by a host computer, and components $x_A$ and $x_B$ of the vector $\vec{OA}$ and the radius $r_1$ of the wheel 501 are inherent parameters of the vehicle 1. Thus, only one time variable t exists at a right side of the formula (7), such that a steering angle $\theta_1$ of the wheel 501 at each moment may be computed. If the steering angle $\theta_1$ computed according to the formula (7) is substituted into the formula (8), the rotation velocity $n_1$ of the driving motor of the wheel 501 may be computed. Based on this, the processor of the vehicle 1 may control a servo motor of the wheel 501, such that the wheel 501 rotates around the vertical rotation axis to an angle $\theta_1$, and the rotation velocity of the driving motor of the wheel 501 is controlled to be $n_1$. In this case, motion of the vehicle 1 satisfies a requirement for decoupling motion.

With reference to FIG. 3, when the vehicle 1 moves from the position 303 to fetch the goods 308 through the pallet fork, the wheel 501 may be controlled according to the above description of FIG. 5. In this way, when the vehicle 1 arrives at the position 304, an included angle α exists between the vehicle body direction 201 and the tangent line direction 202.

Figure 6:
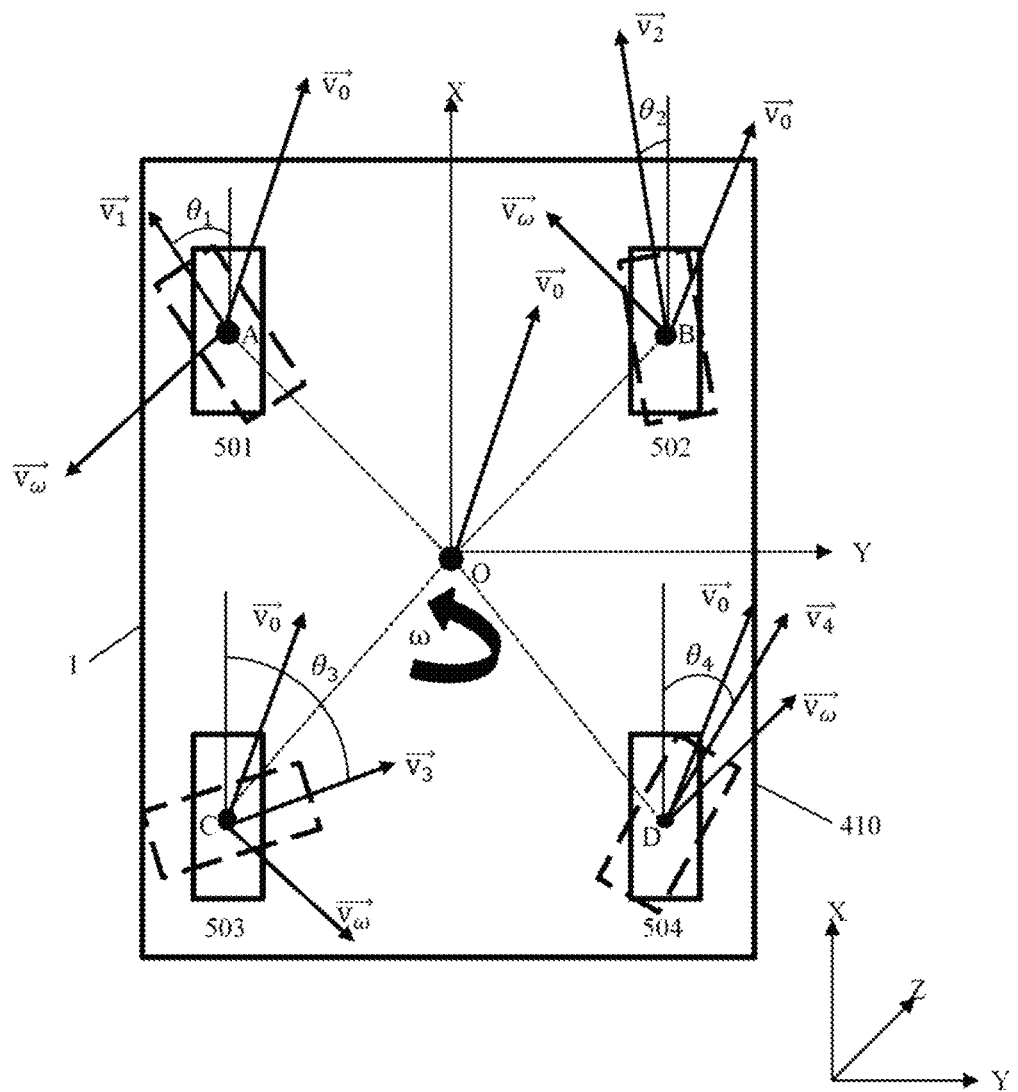
FIG. 6 shows a schematic diagram of a top view of a body of a vehicle in some other embodiments.

FIG. 6 shows a schematic diagram of another top view of the vehicle 1 in some embodiments.

The vehicle 1 includes a vehicle body 410 and a pallet fork (not shown in the figure). The vehicle body 410 includes wheels 501, 502, 503, and 504. A central point of the vehicle body 410 is denoted by O, and a central point of the wheel 501 is denoted by A. Different from FIG. 5, FIG. 6 shows the wheels 501, 502, 503, and 504 that may all rotate around vertical rotation axes passing respective central points A, B, C, and D. The dotted line in FIG. 6 shows wheel contours after the wheels 501, 502, 503 and 504 rotate around the respective vertical rotation axes by angles $\theta_1$, $\theta_2$, $\theta_3$, and $\theta_4$. The angles $\theta_1$, $\theta_2$, $\theta_3$ and $\theta_4$ are referred to as steering angles of the wheels 501, 502, 503 and 504 respectively, and are defined as included angles between all the wheels and the vehicle body direction.

The velocity vectors of the wheels 501, 502, 503 and 504 are labeled as $\vec{v_1}$, $\vec{v_2}$, $\vec{v_3}$ and $\vec{v_4}$. Distance vectors from the central point O of the vehicle body 410 to rotation center points A, B, C and D of the wheels 501, 502, 503 and 504 are $\vec{OA}$, $\vec{OB}$, $\vec{OC}$ and $\vec{OD}$ respectively. Radii of the wheels 501, 502, 503 and 504 are $r_1$, $r_2$, $r_3$ and $r_4$ respectively. Rotation velocities of driving motors of the wheels 501, 502, 503 and 504 are $n_1$, $n_2$, $n_3$ and $n_4$ respectively. The remaining reference signs in FIG. 6 are identical to those in FIG. 5.

To implement decoupling motion of rotation and translation of the vehicle body 410 of the vehicle 1, a motion relation of the vehicle body 410 and the wheels 501, 502, 503 and 504 has to satisfy the following formula:

$$\vec{v}_1 = \vec{\omega} \times \vec{OA} + \vec{v}_0$$

$$\vec{v}_2 = \vec{\omega} \times \vec{OB} + \vec{v}_0$$

$$\vec{v}_3 = \vec{\omega} \times \vec{OC} + \vec{v}_0$$

$$\vec{v}_4 = \vec{\omega} \times \vec{OD} + \vec{v}_0 \quad (9)$$

Directions of the velocity vectors $\vec{v}_1$, $\vec{v}_2$, $\vec{v}_3$ and $\vec{v}_4$ of the wheels 501, 502, 503 and 504 are identical to those of the wheels 501, 502, 503 and 504. Magnitudes of the velocity vectors $\vec{v}_1$, $\vec{v}_2$, $\vec{v}_3$ and $\vec{v}_4$ of the wheels 501, 502, 503 and 504 are identical to velocities of the wheels 501, 502, 503 and 504.

During actual running of the vehicle 1, the translational velocity vector $\vec{v}_0$ and the angular velocity vector $\vec{\omega}$ of the vehicle body 410 are preset system values. A distance vector $\vec{OA}$, $\vec{OB}$, $\vec{OC}$, $\vec{OD}$ is an inherent parameter of the vehicle 1. Thus, the velocity vectors $\vec{v}_1$, $\vec{v}_2$, $\vec{v}_3$ and $\vec{v}_4$ of the wheels 501, 502, 503 and 504 may be computed according to the above formula. The processor of the vehicle 1 adjusts a direction of the wheel 501 according to the direction of the velocity vector $\vec{v}_1$, and adjusts the velocities of the wheels 501, 502, 503 and 504 according to the magnitudes of the velocity vectors $\vec{v}_1$, $\vec{v}_2$, $\vec{v}_3$ and $\vec{v}_4$, such that decoupling motion of the vehicle 1 is implemented.

Similar to FIG. 5, FIG. 6 establishes a vehicle body coordinate system OXYZ with the central point O of the vehicle body 410 as the origin. In the vehicle body coordinate system OXYZ, an angular velocity vector $\vec{\omega}$ of the vehicle body 410 may be expressed as $(0, 0, \omega)$. According to a right-hand rule, a direction of an angular velocity vector $\vec{\omega}$ is perpendicular to a paper surface and faces upward in FIG. 5 (that is, in an opposite direction along a Z axis). A translational velocity $\vec{v}_0$ of the vehicle body 410 may be expressed as $(v_x, v_y, 0)$. As the translational velocity $\vec{v}_0$ of the vehicle body 410 is parallel to a plane of the vehicle body, no Z axis component exists. In an initial state of the vehicle 1, the direction of the translational velocity $\vec{v}_0$ of the vehicle body 410 is identical to the positive direction of the X axis. When the vehicle body 410 rotates at the angular velocity $\omega$, a component of the translational velocity $\vec{v}_0$ of the vehicle body 410 is $v_x$, and $v_y$ constitutes a function of time t. Specifically, $v_x$ and $v_y$ satisfy the following relations:

$$v_x = v_0 \cos(\omega t)$$

$$v_y = v_0 \sin(\omega t) \quad (10)$$

The velocity vectors $\vec{v}_1$, $\vec{v}_2$, $\vec{v}_3$ and $\vec{v}_4$ of the wheels 501, 502, 503 and 504 may be expressed as components of the OXYZ coordinate system through the steering angles $\theta_1$, $\theta_2$, $\theta_3$, and $\theta_4$ as follows:

$$\vec{v}_1 = v_1 * \begin{pmatrix} \cos\theta_1 \\ \sin\theta_1 \\ 0 \end{pmatrix} \quad (11)$$

$$\vec{v}_2 = v_2 * \begin{pmatrix} \cos\theta_2 \\ \sin\theta_2 \\ 0 \end{pmatrix}$$

$$\vec{v}_3 = v_3 * \begin{pmatrix} \cos\theta_3 \\ \sin\theta_3 \\ 0 \end{pmatrix},$$

$$\vec{v}_4 = v_4 * \begin{pmatrix} \cos\theta_4 \\ \sin\theta_4 \\ 0 \end{pmatrix}$$

where $v_1$, $v_2$, $v_3$ and $v_4$ denote the magnitudes of the velocity vectors $\vec{v}_1$, $\vec{v}_2$, $\vec{v}_3$ and $\vec{v}_4$ of the wheels 501, 502, 503 and 504, that is, the velocities of all the wheels. As the wheels 501, 502, 503 and 504 move along a plane of the vehicle body, the Z axis component is 0.

Further, if radii $r_1$, $r_2$, $r_3$ and $r_4$ of the wheels 501, 502, 503 and 504 and the rotation velocities $n_1$, $n_2$, $n_3$ and $n_4$ of the driving motors are substituted, the velocities of the wheels 501, 502, 503 and 504 are as follows:

$$v_1 = 2\pi n_1 * r_1$$

$$v_2 = 2\pi n_2 * r_2$$

$$v_3 = 2\pi n_3 * r_3$$

$$v_4 = 2\pi n_4 * r_4 \quad (12)$$

In conclusion, the velocity vector $\vec{v}_1$ of the wheel 501 may be expressed as:

$$\vec{v}_1 = 2\pi n_1 * r_1 * \begin{pmatrix} \cos\theta_1 \\ \sin\theta_1 \\ 0 \end{pmatrix} \quad (13)$$

$$\vec{v}_2 = 2\pi n_2 * r_2 * \begin{pmatrix} \cos\theta_2 \\ \sin\theta_2 \\ 0 \end{pmatrix}$$

$$\vec{v}_3 = 2\pi n_3 * r_3 * \begin{pmatrix} \cos\theta_3 \\ \sin\theta_3 \\ 0 \end{pmatrix}$$

$$\vec{v}_4 = 2\pi n_4 * r_4 * \begin{pmatrix} \cos\theta_4 \\ \sin\theta_4 \\ 0 \end{pmatrix}$$

Similarly, components of distance vectors $\vec{OA}$, $\vec{OB}$, $\vec{OC}$, $\vec{OD}$ from the central point O of the vehicle body 410 to the rotation center points A, B, C and D of the wheels 501, 502, 503 and 504 in the OXYZ coordinate system may be expressed as:

$$\vec{OA} = \begin{pmatrix} x_A \\ y_A \\ z_A \end{pmatrix} \quad (14)$$

-continued $$\vec{OB} = \begin{pmatrix} x_B \\ y_B \\ z_B \end{pmatrix}$$

$$\vec{OC} = \begin{pmatrix} x_C \\ y_C \\ z_C \end{pmatrix}$$

$$\vec{OD} = \begin{pmatrix} x_D \\ y_D \\ z_D \end{pmatrix}$$

Through integration of the formulas (9) to (14), the steering angles $\theta_1$, $\theta_2$, $\theta_3$ and $\theta_4$ of the wheels 501, 502, 503 and 504 and the rotation velocities $n_1$, $n_2$, $n_3$ and $n_4$ of all the wheels 501, 502, 503 and 504 may be determined. Specific computation formulas are:

$$\theta_1 = \tan^{-1}\left[\frac{x_A\omega + v_0\sin(\omega t)}{-y_A\omega + v_0\cos(\omega t)}\right] \quad (15)$$

$$\theta_2 = \tan^{-1}\left[\frac{x_B\omega + v_0\sin(\omega t)}{-y_B\omega + v_0\cos(\omega t)}\right]$$

$$\theta_3 = \tan^{-1}\left[\frac{x_C\omega + v_0\sin(\omega t)}{-y_C\omega + v_0\cos(\omega t)}\right]$$

$$\theta_4 = \tan^{-1}\left[\frac{x_D\omega + v_0\sin(\omega t)}{-y_D\omega + v_0\cos(\omega t)}\right]$$

$$n_1 = \frac{x_A\omega + v_0\sin(\omega t)}{2\pi r_1 \sin\theta_1} \quad (16)$$

$$n_2 = \frac{x_B\omega + \sin(\omega t)}{2\pi r_2 \sin\theta_2}$$

$$n_3 = \frac{x_C\omega + v_0\sin(\omega t)}{2\pi r_3 \sin\theta_3}$$

$$n_4 = \frac{x_D\omega + v_0\sin(\omega t)}{2\pi r_4 \sin\theta_4}$$

In the above formulas, the magnitudes of the angular velocity $\omega$ and the translational velocity $\vec{v_0}$ of the vehicle body 410 are preset values transmitted by a host computer, and the vector $\vec{OA}$, $\vec{OB}$, $\vec{OC}$, $\vec{OD}$ and the radii $r_1$, $r_2$, $r_3$ and $r_4$ of the wheels 501, 502, 503 and 504 are all inherent parameters of the vehicle 1. Thus, only one time variable t exists at a right side of the formula (15), such that the steering angles $\theta_1$, $\theta_2$, $\theta_3$ and $\theta_4$ of all the wheels at each moment may be computed. If the steering angles $\theta_1$, $\theta_2$, $\theta_3$ and $\theta_4$ computed according to the formula (15) are substituted into the formula (16) separately, the rotation velocity $n_1$ of the driving motor of the wheel 501 may be computed. Based on this, the processor of the vehicle 1 may control a servo motor of the wheel 501, such that the wheel 501 rotates around the vertical rotation axis to an angle $\theta_1$, and the rotation velocities of the driving motor of the wheel 501 are controlled to be $n_1$, $n_2$, $n_3$, and $n_4$. In this case, motion of the vehicle 1 satisfies a requirement for decoupling motion.

According to an embodiment of the disclosure, the processor of the vehicle 1 updates the steering angle of the wheel and the rotation velocity of the driving motor once per second according to the formulas (1) to (16), transmits the computed steering angle to the servo motor for execution, and transmits the rotation velocity to the driving motor for execution.

In another embodiment, the processor updates the steering angle and the rotation velocity of the wheel at a frequency of every 0.2 s, every 0.5 s, every 1.5 s, every 2 s, every 2.5 s and every 3 s separately, transmits the computed steering angle to the servo motor for execution, and transmits the rotation velocity to the driving motor for execution.

In an optional embodiment, preset angular velocities of the vehicle body 410 of the vehicle 1 are 0.5°/s, 1°/s, 2°/s, 5°/s, and 10°/s. A smaller preset angular velocity indicates slower steering of the vehicle body 410, and higher steering control precision.

In an optional embodiment, preset translational velocities of the vehicle 1 are 0.1 m/s, 0.2 m/s, 0.5 m/s, 1 m/s, 1.5 m/s, and 2 m/s. A smaller preset translational velocity indicates slower driving of the vehicle 1, and a higher security coefficient.

In an optional embodiment, the vehicle 1 includes two steering wheels 501 and 502 and two driven wheels 503 and 504. A control method for decoupling motion of the vehicle is identical to those in the embodiments shown in FIGS. 5 and 6.

In an optional embodiment, the vehicle 1 includes two steering wheels 501 and 504 and two driven wheels 502 and 503. A control method for decoupling motion of the vehicle is identical to those in the embodiments shown in FIGS. 5 and 6.

In an optional embodiment, the vehicle 1 includes two steering wheels 501, 502 and 504 and one driven wheel 503. A control method for decoupling motion of the vehicle is identical to those in the embodiments shown in FIGS. 5 and 6.

In an optional embodiment, the vehicle 1 includes two steering wheels 501, 502 and 503 and one driven wheel 504. A control method for decoupling motion of the vehicle is identical to those in the embodiments shown in FIGS. 5 and 6.

For example, with reference to FIG. 3, when the vehicle 1 moves from the position 303 to fetch the goods 308 through the pallet fork, one or more of the wheels 501, 502, 503 and 504 may be controlled according to the above description of FIG. 6. In this way, when the vehicle 1 moves from the position 304 to the position 305, an included angle β exists between the vehicle body direction 201 and the tangent line direction 202 of the path.

Figure 7:
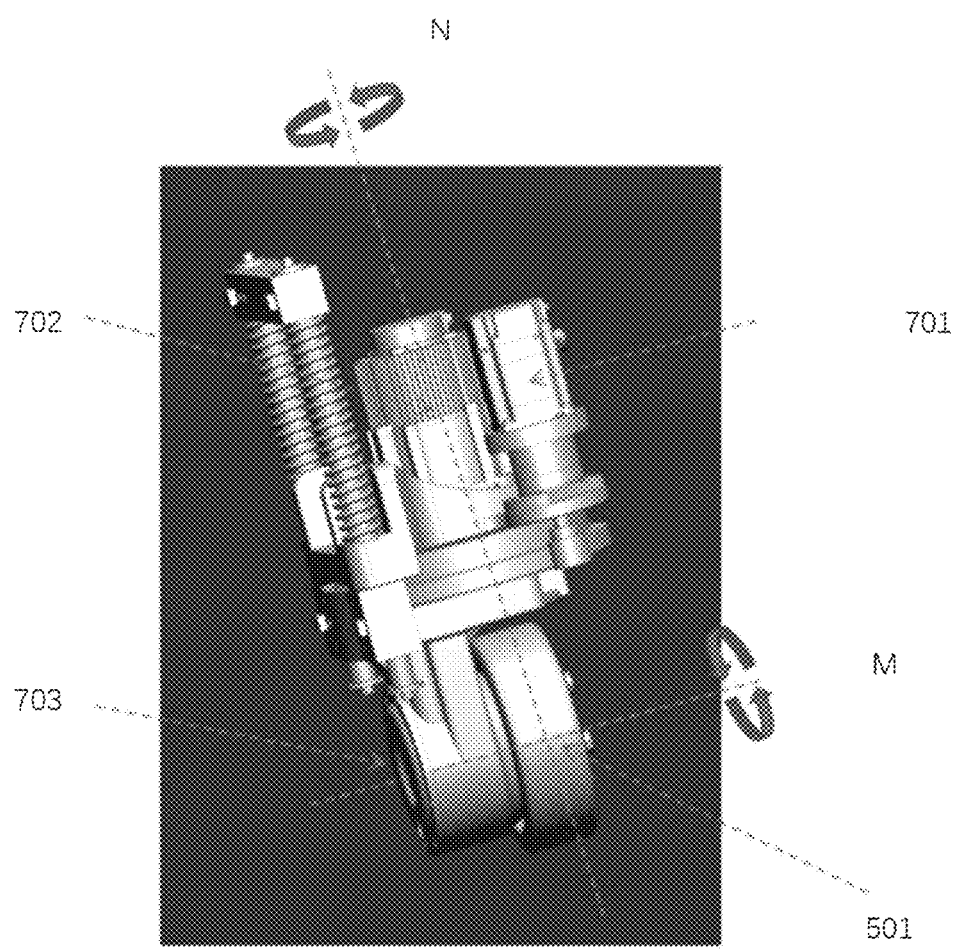
FIG. 7 shows a steering driving mechanism in some embodiments.

FIG. 7 shows a schematic diagram of a steering driving apparatus of the vehicle 1 in some embodiments.

FIG. 7 shows a schematic diagram of a steering driving apparatus of a wheel. The steering driving apparatus in the figure includes a servo motor 701, a driving motor 702, and a decelerator 703. The servo motor 701 is used to drive a corresponding wheel to rotate around a vertical rotation axis N, so as to steer the wheel. The driving motor 702 is used to drive a corresponding wheel to rotate around a horizontal rotation axis M, so as to move the wheel forward or backward. The decelerator 703 is used to adjust torque of a corresponding wheel.

In some embodiments, all the vehicles include the steering driving apparatuses, and for example, the embodiment shown in FIG. 6. In some other embodiments, only one wheel includes the steering driving apparatus. For example, the wheel 501 includes the steering driving apparatus, and for example, the embodiment shown in FIG. 5. Alternatively, for example, the wheel 502, 503 or 504 includes the steering driving apparatus. In some other embodiments, two wheels include the steering driving apparatuses. For example, the wheels 501 and 502, the wheels 501 and 504, or the wheels 502 and 503 include the steering driving apparatuses. In some other embodiments, three wheels include the steering driving apparatuses. For example, the wheels 501, 502 and 503, the wheels 501, 502 and 504, the wheels 501, 503 and 504, or the wheels 502, 503 and 504 include the steering driving apparatuses.

With reference to FIG. 5, when the wheel 501 uses the steering driving apparatus shown in FIG. 7, influence of a reduction ratio of the decelerator 703 on the rotation velocity of the wheel should further be considered. A reduction ratio of the decelerator 603 is $i_1$. Thus, a computation formula of the rotation velocity $n_1$ of the driving motor 702 of the wheel 501 is corrected as follows:

$$n_1 = \frac{x_A\omega + v_0\sin(\omega t)}{2\pi r_1 i_1 \sin\theta_1} \qquad (17)$$

With reference to FIG. 6, when the wheels 501, 502, 503 and 504 use the steering driving apparatus shown in FIG. 7, influence of a reduction ratio of the decelerator 703 on the rotation velocity of the wheel should further be considered. The reduction ratios of the decelerator 703 are $i_1$, $i_2$, $i_3$, $i_4$, respectively. Thus, a computation formula of the rotation velocities $n_1$, $n_2$, $n_3$ and $n_4$ of the driving motor 702 of the wheels 501, 502, 503 and 504 is corrected as follows:

$$n_1 = \frac{x_A\omega + v_0\sin(\omega t)}{2\pi r_1 i_1 \sin\theta_1} \qquad (18)$$
$$n_2 = \frac{x_B\omega + v_0\sin(\omega t)}{2\pi r_2 i_2 \sin\theta_2}$$
$$n_3 = \frac{x_C\omega + v_0\sin(\omega t)}{2\pi r_3 i_3 \sin\theta_3}$$
$$n_4 = \frac{x_D\omega + v_0\sin(\omega t)}{2\pi r_4 i_4 \sin\theta_4}$$

Figure 8:
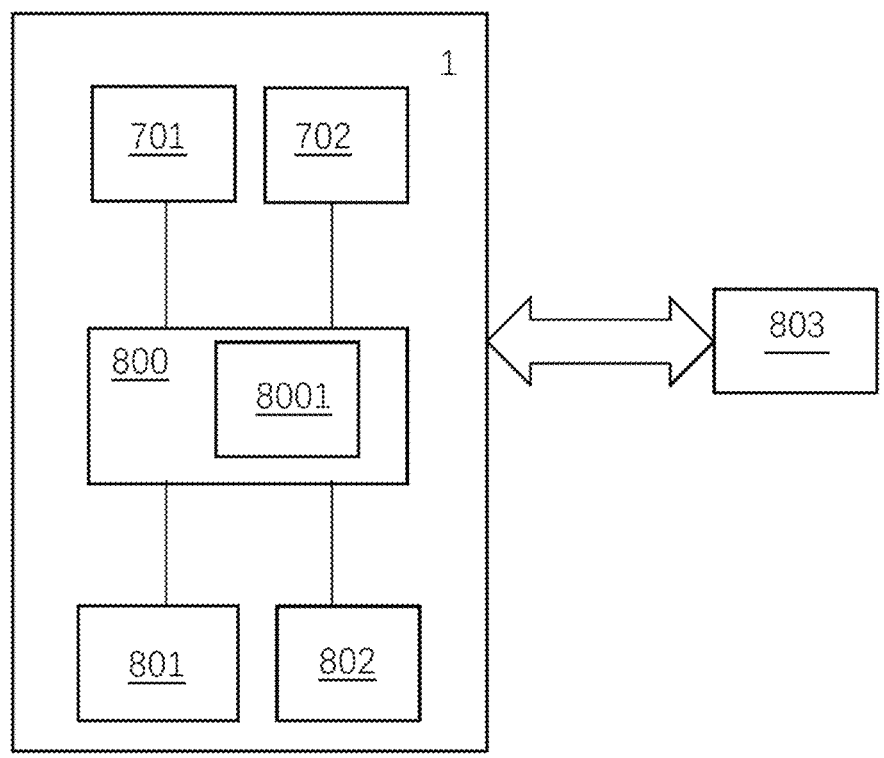
FIG. 8 shows a schematic diagram of assemblies of a vehicle in some embodiments.

FIG. 8 shows a schematic diagram of a constituent part of the vehicle 1 in some embodiments.

The vehicle 1 may include, but is not limited to, for example, a controller 800, a servo motor 701, a driving motor 702, a sensor 801, an interface 802, and a host computer 803. The controller 800 includes a processor 8001.

Optionally, the controller 800 may include, but is not limited to, for example, one or more processors 8001, memories and communication ports used to receive, process and transmit data. In some implementation solutions, the controller 800 may include, but is not limited to, a mobile computing apparatus, and for example, a tablet computer or another suitable mobile computing apparatus. The mobile computing apparatus includes a processor 8001. The processor 8001 may be further communicatively coupled (for example, in a wired and/or wireless connection manner) to driving motors 702 of one or more wheels, one or more vehicle sensors 801, servo motors 701 of one or more wheels, one or more input/output apparatuses (not shown in the figure), a wireless interface 802, etc. In some implementation solutions, the vehicle sensor 801 may be connected to the processor 8001 through, for example but not limited to, a vehicle bus. For example, the vehicle bus (for example, a forklift bus) may include a load sensor (for example, a goods arrival sensor) that detects a vehicle load and other suitable vehicle sensors. The input/output apparatuses may include various input apparatuses (for example, a touch screen, a microphone, a pointing apparatus, a keyboard, a scanner and other suitable input apparatuses) and various output apparatuses (for example, a display screen, a speaker, a tactile output apparatus and other suitable output apparatuses). For example, the wireless interface 802 may include a communication interface used to conduct wireless communication with other vehicle systems and/or a central system through one or more long-range and/or short-range communication protocols.

A communication unit is used to receive an instruction signal transmitted by the host computer 803 (for example, a central control room or a central processing unit) through the wireless interface 802, so as to indicate a velocity, a travel route, and/or destination information of the forklift. A pose perception unit includes one or more sensors 801 used to determine a real-time position, a velocity and a steering angle (a steering angle) of the forklift, a distance from the forklift to an obstacle, whether a pallet fork is loaded with goods, a size and a weight of the loaded goods, etc.

The host computer 803 may include one or more computer servers and one or more databases. For example, the host computer 803 may be or include various types of servers, including (but not limited to) an application program server, a web server, a proxy server, or a server cluster. In the example, the host computer 803 creates a spatial model representing an environment (for example, a warehouse environment). For example, the spatial model may be implemented as a point cloud system, where a data point is defined in a three-dimensional coordinate system with X, Y, and Z coordinates. For example, various objects in the warehouse environment may be represented in the spatial model, and corresponding positions of the objects may be tracked through a three-dimensional coordinate system (for example, through a simultaneous localization and mapping (SLAM) algorithm). The host computer may further include one or more input/output apparatuses and/or be in communication with the vehicle. The input/output apparatuses may include various input apparatuses (for example, a touch screen, a microphone, a pointing apparatus, a keyboard, a scanner and other suitable input apparatuses) and various output apparatuses (for example, a display screen, a speaker, a tactile output apparatus and other suitable output apparatuses).

In an embodiment, the vehicle 1 is an unmanned forklift, and communication between the forklift and the host computer 803 may occur through one or more networks. Examples of a network include a local area network (LAN), a wide area network (WAN), and the Internet. For example, a host computer 506 may transmit information of a navigation route from a current position to a destination to the forklift. The host computer 803 may further transmit information of a velocity of a vehicle body of the forklift. For example, the host computer 803 transmits signals of a magnitude and a direction of the translational velocity $\vec{v_0}$ of the vehicle body 410 of the vehicle 1 in a wireless transmission manner. After the processor 8001 of the vehicle 1 receives the information through the wireless interface 802, the rotation velocities $n_1$, $n_2$, $n_3$ and $n_4$ of the driving motors 702 of one or more wheels 501, 502, 503 and 504 are computed according to the formulas (1) to (18). The processor 8001 further controls the one or more driving motors 702 to rotate at the computed rotation velocities $n_1$, $n_2$, $n_3$, and $n_4$.

To implement decoupling motion, the host computer 803 is further in communication with the forklift, and transmits an instruction for steering the vehicle body to the forklift. For example, the host computer 803 transmits signals of a magnitude and a direction of the angular velocity $\vec{\omega}$ of the vehicle body 410 of the vehicle 1 in a wireless transmission manner. After the processor 8001 of the vehicle 1 receives the information through the wireless interface 802, steering angles $\theta_1$, $\theta_2$, $\theta_3$ and $\theta_4$ of the servo motors 701 of one or more wheels 501, 502, 503 and 504 are computed according to the formulas (1) to (18). The processor 8001 further controls the one or more servo motors 701 to drive the corresponding wheels to rotate around the vertical rotation axis N by the computed steering angles $\theta_1$, $\theta_2$, $\theta_3$, and $\theta_4$.

According to the following method described in detail in the disclosure, the vehicle body of the forklift is steered while the forklift moves along a navigation route. Finally, when the forklift reaches the destination, the vehicle body of the forklift is steered to a preset rotation angle. In a steering process, the forklift with decoupling motion needs to deviate from a preset navigation route only when an obstacle is located in the navigation route. In a case where a limited zone is narrow in space and goods are placed at any position (not limited to a position directly in front of the pallet fork of the forklift), passability and a goods-fetching success rate of the forklift with decoupling motion are both obviously improved.

Figure 9:
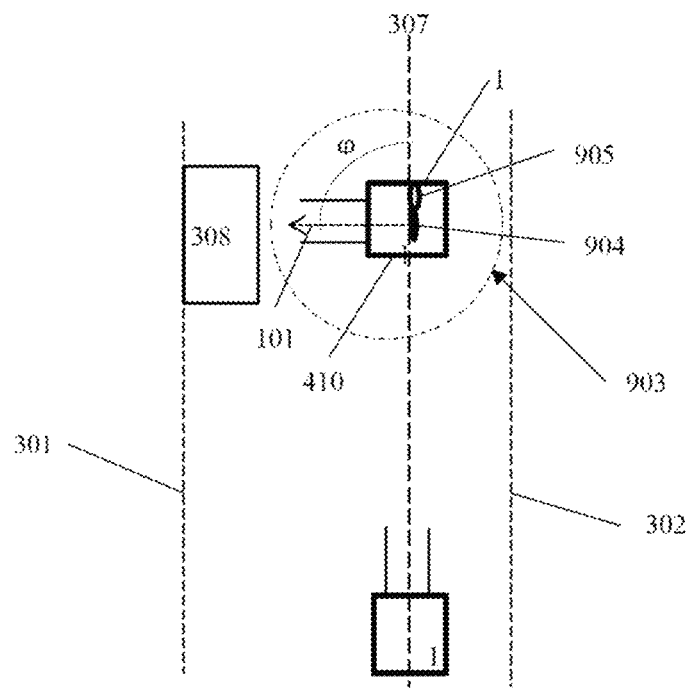
FIG. 9 shows a schematic diagram of a target pose of a vehicle in some embodiments.

FIG. 9 shows a schematic diagram of a pose of the vehicle 1 reaching a destination in some embodiments. The "pose" in the disclosure refers to a position of the vehicle 1 in, for example, a warehouse and an orientation of the vehicle 1.

As shown in FIG. 9, the vehicle 1 moves toward the position of the goods 308 along a path identical to the path 307 shown in FIG. 3. The processor 8001 controls the vehicle 1 to turn left while moving forward, such that a direction of the vehicle 1 is finally steered to a direction suitable for forking the goods 308. To obtain the vehicle body direction 201 of the vehicle body 410 of the vehicle 1, the sensor 801 of the vehicle 1 further includes an angle sensor 904. When the processor 8001 controls the steering angle and the rotation velocity of the wheel according to the embodiments shown in FIGS. 5 to 8, the angle sensor 904 mounted on the vehicle body 410 obtains a steering angle $\varphi$ of the vehicle body 410 in real time, and the processor 8001 compares a value of the steering angle $\varphi$ of the vehicle body obtained by the angle sensor with a target angle value. If a vehicle body angle value is not equal to the target angle value, the processor 8001 controls the wheel to continue to steer according to the steering angle, computed through the formulas (1) to (18), of the wheel. If the vehicle body angle value is equal to the target angle value, the processor 8001 controls the angular velocity $\omega$ of the vehicle body 410 to be 0.

In an optional embodiment, when an absolute value of a difference between the vehicle body angle value and the target angle value is less than preset $\Delta\theta$, the processor 8001 controls the angular velocity $\omega$ of the vehicle body 410 to be 0. Different degrees of precision of $\Delta\theta$ may be selected according to actual needs. For example, $\Delta\theta$ may be less than or equal to 5°, less than or equal to ±4°, less than or equal to ±3°, less than or equal to ±2°, less than or equal to ±1°, less than or equal to ±0.5°, less than or equal to ±0.2°, less than or equal to ±0.1°, less than or equal to ±0.05°, etc.

In another embodiment, when the vehicle body angle value is greater than the target angle value, the processor 8001 controls the wheel to continue to steer according to the steering angle computed through the formulas (1) to (18).

In another embodiment, for the vehicle 1, without the angle sensor 904 mounted on the vehicle body 410, the host computer 803 determines whether the vehicle 1 completes target steering based on a coordinate position of the vehicle 1 in the spatial model (for example, a spatial model of the warehouse). When the host computer 803 determines that the vehicle 1 completes target steering, the host computer 803 transmits an instruction signal of stopping rotation of the vehicle body 410 to the vehicle 1. After the processor 8001 of the vehicle 1 receives the above instruction from the host computer 803 through the wireless interface 802, the angular velocity $\omega$ of the vehicle body 410 is controlled to be 0.

As shown in FIG. 9, during running, the vehicle 1 needs to keep a secure distance from boundaries 901 and 902 of a channel. Thus, the vehicle 1 further includes a distance sensor (for example, a two-dimensional (2D) or three-dimensional (3D) laser sensor) 905. The distance sensor 905 is used to detect whether another object exists around the vehicle 1. When the distance sensor 905 detects that a distance between the vehicle 1 and an object (for example, a right boundary 302) closest to the vehicle is greater than the secure distance 903, the processor 8001 controls each steering wheel to continue to move forward according to the rotation velocity of the wheel obtained through the formulas (1) to (18). When the distance sensor 905 detects that a distance between the vehicle 1 and an object (for example, a right boundary 302) closest to the vehicle is less than or equal to the secure distance 903, the processor 8001 controls the rotation velocities of all steering wheels of the vehicle 1 to be 0.

In another embodiment, a plurality of distance sensors 905 are arranged at different parts of the vehicle 1, such that a detection range may more comprehensively cover surroundings of the vehicle, and passing security of the vehicle 1 is improved.

In another embodiment, the position of the vehicle 1 is tracked through the host computer 803. If the tracked position of the vehicle 1 does not reach a target position, the processor 8001 controls each steering wheel to continue to move forward at the rotation velocity of the wheel obtained through the formula.

Figure 10:
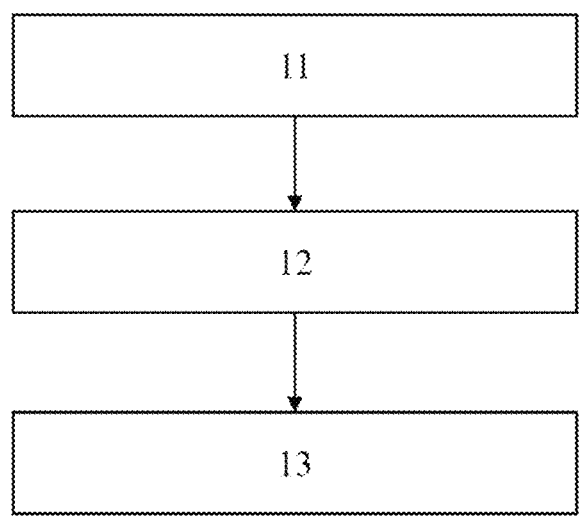
FIG. 10 shows a control method for decoupling motion of a vehicle in some embodiments.

FIG. 10 shows a control method for decoupling motion of a vehicle in some embodiments.

As shown in FIG. 10, according to an embodiment of the disclosure, a control method for a vehicle includes the following steps: control parameters 11 are input, and a processor 8001 of the vehicle determines a motion parameter 12 of each steering wheel according to the input parameter, and executes control 13 of each steering wheel.

Figure 11:
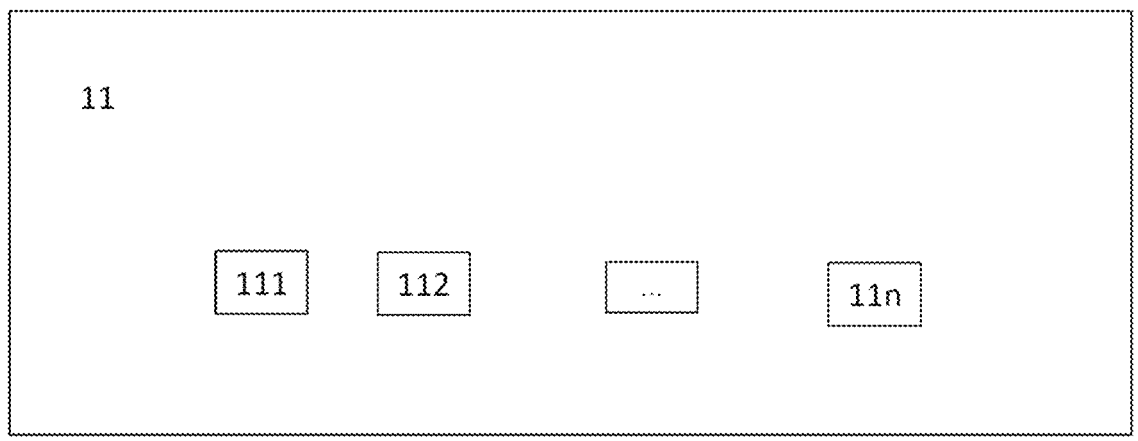
FIG. 11 shows input parameters of decoupling motion of a vehicle in some embodiments.

FIG. 11 shows input parameters of decoupling motion of a vehicle in some embodiments.

As shown in FIG. 11, the input control parameters 11 include a parameter 111, a parameter 112, . . . , and a parameter 11n. The parameter 111, the parameter 112, . . . , and the parameter 11n each include any one of the following: an angular velocity vector or scalar of a vehicle body 410, a translational velocity vector or scalar of the vehicle 1, a distance vector or scalar from a central point of the vehicle body 410 to a central point of each steering wheel, etc.

Figure 12:
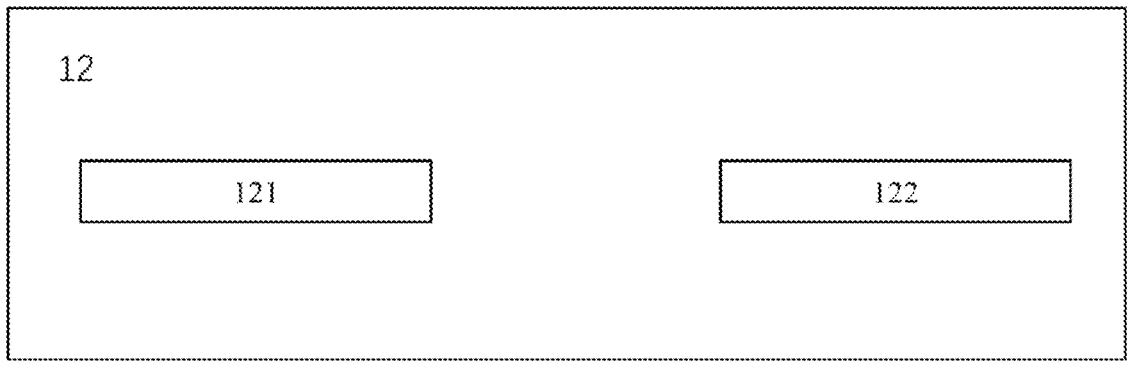
FIG. 12 shows output parameters of decoupling motion of a vehicle in some embodiments.

FIG. 12 shows output parameters of decoupling motion of a vehicle in some embodiments.

As shown in FIG. 12, a motion parameter 12 of each steering wheel includes a parameter 121 and a parameter 122. The parameter 121 includes any one of the following: a rotation angle of a corresponding steering wheel around a vertical rotation axis, an angle of a corresponding servo motor, and an angle measured by an angle sensor of the corresponding steering wheel. The parameter 122 includes any one of the following: an angular velocity of a corresponding steering wheel, a rotation velocity of a corresponding steering wheel, a velocity of a corresponding steering wheel, and a rotation velocity of a corresponding driving motor.

Figure 13:
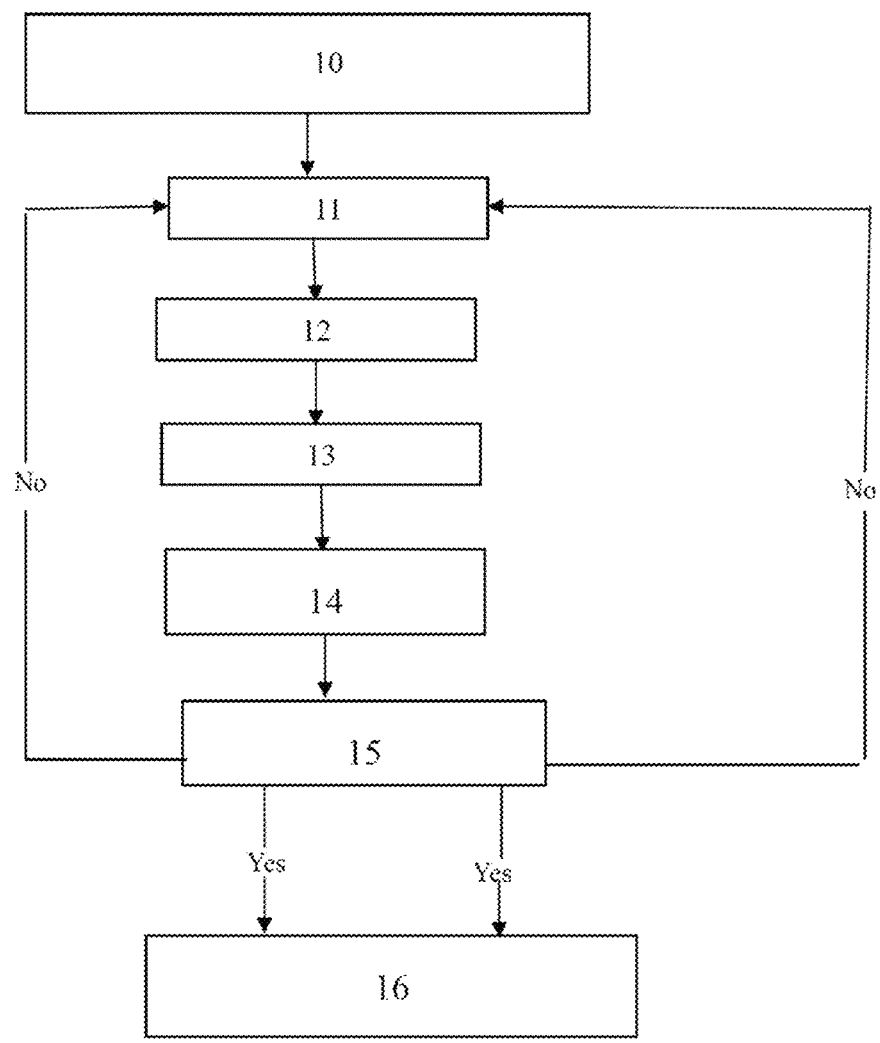
FIG. 13 shows a control method for a vehicle in some embodiments.

FIG. 13 shows a control method for a vehicle in some embodiments.

As shown in FIG. 13, an embodiment of the disclosure discloses a control method for a vehicle pose. The method the following steps: a target parameter 10 is set, and steps 11 to 16 are conducted. Steps 11 to 13 are identical to steps 11 to 13 in FIG. 10.

Further, in step 14, a vehicle pose parameter is determined.

Further, in step 15, the vehicle pose parameter is compared with a target parameter, and if the vehicle pose parameter does not reach the target parameter, step 11 is returned to and re-executed.

Further, in step 16, whether the vehicle pose parameter reaches the target parameter is determined, and the processor 8001 controls the vehicle to stop moving.

Figure 14:
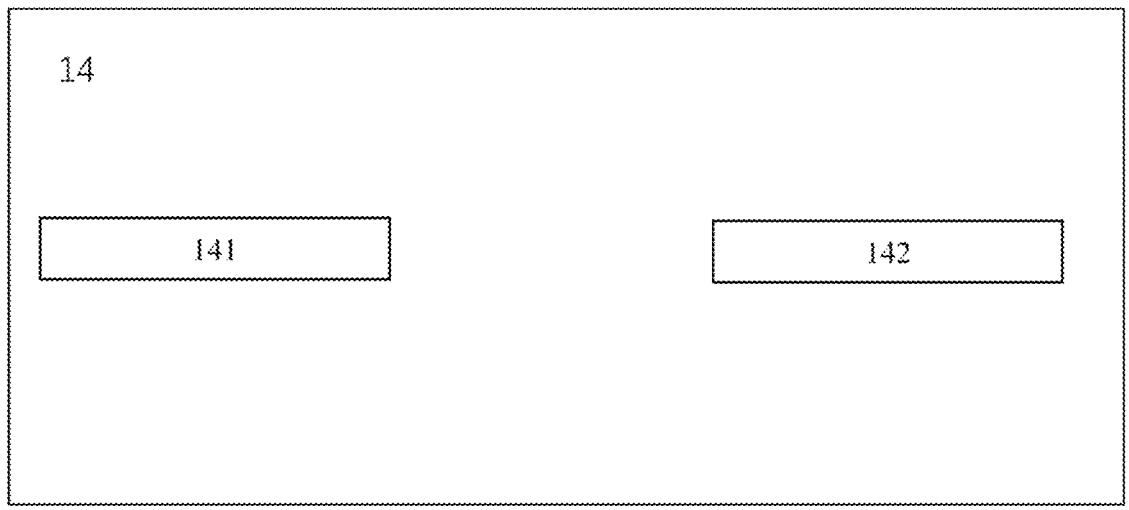
FIG. 14 shows pose parameters of a vehicle in some embodiments.

FIG. 14 shows pose parameters of a vehicle in some embodiments.

As shown in FIG. 14, the vehicle pose parameters include a parameter 141 and a parameter 142. The parameter 141 includes any one of the following: a direction of the vehicle body 410, a rotation angle of the vehicle body 410, and an included angle between a positive direction of an X axis in an OXYZ coordinate system of the vehicle body 410 and a positive direction of the X axis in an initial state. The parameter 142 includes any one of the following: a distance from the vehicle 1 to a closest object, a smallest distance from the vehicle 1 to an edge of a channel, a distance from the vehicle 1 to to-be-fetched goods, a distance from the vehicle 1 to an extreme end of a channel, and a position of the vehicle 1 in a spatial model.

According to an embodiment of the disclosure, the vehicle 1 includes a controller 800. The controller 800 integrates a processor 8001. The processor 8001 is in communication connection with a host computer 803 through a wireless interface 802. The processor 8001 receives information of a translational velocity of the vehicle 1 and a rotation velocity of the vehicle body 410 transmitted by the host computer 803. Meanwhile, the processor 8001 receives information of a target position of the vehicle 1 and target steering of the vehicle body 410 transmitted by the host computer 803. The processor 8001 determines the steering angle and the rotation velocity of each steering wheel according to the method disclosed in the disclosure. The processor 8001 transmits the determined steering angle to the servo motor to steer the steering wheel. The processor 8001 transmits the determined rotation velocity to a driving motor to drive the steering wheel to move forward.

Further, the processor 8001 determines the steering angle of the vehicle body through an angle sensor 904 mounted on the vehicle body 410. In addition, the processor 8001 determines a distance from the vehicle 1 to a closest obstacle through a distance sensor 905 mounted on the vehicle 1.

Further, the processor 8001 compares the steering angle of the vehicle body 410 with a target steering angle, so as to determine whether the vehicle body 410 reaches the target steering angle. Further, the processor 8001 compares a position of the vehicle 1 with a target position, and determines whether the vehicle 1 reaches the target position.

Benefits, other advantages and solutions to problems are described above with reference to specific embodiments. However, the benefits, advantages, solutions to problems, and any feature that may make any benefit, advantage, or solution conceivable or more prominent are not considered as a key, required, or necessary feature of any or all the claims.

For the sake of clarity, some features described herein in the context of separate embodiments may be provided in combination in a single embodiment. On the contrary, various features described in the context of a single embodiment for the sake of brevity may be provided separately or in any sub-combination. In addition, reference to a value represented by a range includes each value and all values within the range.

The description and figures of the embodiments described herein are intended to provide a general understanding of structures of all the embodiments. The description and figures are not intended to serve as an exhaustive and comprehensive description of all elements and features of apparatuses and systems that use structures or methods described herein. Separate embodiments may be provided in a single embodiment in a combination manner. On the contrary, various features described in the context of a single embodiment for the sake of brevity may be provided separately or in any sub-combination. In addition, reference to a value represented by a range includes each value and all values within the range. Many other embodiments are obvious to those skilled in the art only after the description is read. Other embodiments may be used and obtained according to the content of the disclosure, such that structural replacement, logical replacement, or other changes may be made without departing from the scope of the disclosure. Thus, the disclosure should be regarded as illustrative rather than restrictive.

We claim:

1. A mobile robot, comprising: a controller, the controller executing a program instruction so as to implement the following steps:
   receiving an angular velocity, a translational velocity, a first distance, and a second distance of the mobile robot (1);
   controlling motion of a first wheel (501) of the mobile robot (1) according to the angular velocity, the translational velocity, and the first distance; and
   controlling motion of a second wheel (502) of the mobile robot (1) according to the angular velocity, the translational velocity, and the second distance,
   the motion of each wheel comprising driving rotation and steering rotation, the steps further comprising:
   receiving a predetermined obstacle distance of the mobile robot (1);
   determining an actual obstacle distance of the mobile robot (1);
   comparing the actual obstacle distance with the predetermined obstacle distance; and
   controlling, if the actual obstacle distance is greater than the predetermined obstacle distance, at least one wheel to execute the driving rotation.

2. The mobile robot (1) according to claim 1, wherein the steps further comprise: controlling motion of a third wheel (503) of the mobile robot (1) according to the angular velocity, the translational velocity, and a third distance, the motion of the third wheel comprising driving rotation and steering rotation.

3. The mobile robot (1) according to claim 2, wherein the steps further comprise: controlling motion of a fourth wheel (504) of the mobile robot (1) according to the angular velocity, the translational velocity, and a fourth distance, the motion of the fourth wheel comprising driving rotation and steering rotation.

4. The mobile robot (1) according to claim 1, wherein the motion of at least two wheels is different.

5. The mobile robot (1) according to claim 1, wherein the motion of at least two wheels is identical.

6. The mobile robot (1) according to claim 1, wherein the steering rotation of each wheel is defined by a steering angle ($\theta$) of a corresponding wheel.

7. The mobile robot (1) according to claim 6, wherein steering angles of at least two wheels are different.

8. The mobile robot (1) according to claim 1, wherein the driving rotation of each wheel is defined by a rotation velocity (n) of the corresponding wheel.

9. The mobile robot (1) according to claim 8, wherein rotation velocities of at least two wheels are different.

10. The mobile robot (1) according to claim 1, wherein the steps implemented by the controller further comprise:
    receiving a target steering angle of the mobile robot (1);
    determining a steering angle of the mobile robot (1);
    comparing the steering angle with the target steering angle; and
    controlling, if the steering angle is different from the target steering angle, at least one wheel to execute the steering rotation.

11. The mobile robot (1) according to claim 1, wherein the steps implemented by the controller further comprise:
    controlling, if the actual obstacle distance is smaller than or equal to the predetermined obstacle distance, at least one wheel to stop executing the driving rotation.

12. A control method for a mobile robot, comprising a step of controlling one or more wheels of the mobile robot (1) according to claim 1 to execute driving rotation and/or steering rotation.

13. A controller, configured to execute a program instruction, comprising controlling one or more wheels of the mobile robot (1) according to claim 1 to execute driving rotation and/or steering rotation.

14. The mobile robot (1) according to claim 1, wherein the steps implemented by the controller further comprise:
    receiving a target steering angle of the mobile robot (1);
    determining a steering angle of the mobile robot (1);
    comparing the steering angle with the target steering angle; and
    controlling, if the steering angle is within a predetermined value range from the target steering angle, at least one wheel to stop executing the steering rotation.

15. The mobile robot (1) according to claim 1, wherein the driving rotation of each wheel is executed by a corresponding driving motor, and wherein the controller updates the rotation velocity of each wheel at a first predetermined time interval.

16. The mobile robot (1) according to claim 15, wherein the steering rotation of each wheel is executed by a corresponding servo motor, and wherein the controller updates the steering angle of each wheel at a second predetermined time interval.

17. The mobile robot (1) according to claim 16, wherein the first predetermined time interval is greater than, equal to, or smaller than the second predetermined time interval.

18. The mobile robot (1) according to claim 1, wherein the steps enable formation of a non-zero included angle between a vehicle body direction of the mobile robot and a tangent line direction of a travelling path of the mobile robot.

19. The mobile robot (1) according to claim 18, wherein the controller is configured to:
    independently control the rotational motion of the vehicle body direction and the translational motion of the mobile robot along the tangent line direction of the travelling path, such that changes in the vehicle body direction do not depend on variations in the travelling path.

* * * * *